United States Patent [19]

Gläser

[11] Patent Number: 4,770,437
[45] Date of Patent: * Sep. 13, 1988

[54] FOLDING PUSHCHAIR

[75] Inventor: Dieter Gläser, Dachau, Fed. Rep. of Germany

[73] Assignee: Peg Perego Pines, S.p.A., Arc Ore Milano, Italy

[*] Notice: The portion of the term of this patent subsequent to Aug. 12, 2003 has been disclaimed.

[21] Appl. No.: 855,503

[22] Filed: Apr. 23, 1986

Related U.S. Application Data

[63] Continuation-in-part of Ser. No. 658,665, Oct. 9, 1984, Pat. No. 4,605,243.

[30] Foreign Application Priority Data

Oct. 14, 1983 [DE] Fed. Rep. of Germany ....... 3337493

[51] Int. Cl.[4] .................................................. B62B 7/06
[52] U.S. Cl. .................................... 280/642; 280/650; 280/658
[58] Field of Search ............... 280/642, 643, 644, 650, 280/647

[56] References Cited

U.S. PATENT DOCUMENTS

| | | | |
|---|---|---|---|
| 1,695,409 | 9/1927 | Banks | 280/644 |
| 2,419,790 | 2/1946 | Peltier | 280/642 |
| 2,783,053 | 2/1957 | Sheldrick | 280/642 |
| 4,435,012 | 3/1985 | Kassai | 280/643 |
| 4,506,907 | 3/1985 | Miyagi | 280/642 |
| 4,605,243 | 8/1986 | Glaser | 280/650 |
| 4,632,420 | 12/1986 | Miyagi | 280/650 |
| 4,660,850 | 4/1987 | Nakao et al. | 280/642 |

FOREIGN PATENT DOCUMENTS

| | | | |
|---|---|---|---|
| 1835710 | 7/1961 | Fed. Rep. of Germany . | |
| 7402169 | 8/1974 | Fed. Rep. of Germany . | |
| GM7510128 | 7/1975 | Fed. Rep. of Germany . | |
| 2751628 | 8/1978 | Fed. Rep. of Germany | 280/657 |
| 3102463A1 | 1/1980 | Fed. Rep. of Germany | 280/642 |
| 664813 | 11/1928 | France . | |
| 28432 | of 1910 | United Kingdom | 280/642 |
| 235789 | 6/1925 | United Kingdom . | |
| 1479832 | 7/1977 | United Kingdom . | |
| 1512370 | 6/1978 | United Kingdom . | |
| 1524349 | 9/1978 | United Kingdom . | |
| 1528905 | 10/1978 | United Kingdom . | |
| 1576574 | 10/1980 | United Kingdom | 280/644 |
| 20993764A | 4/1981 | United Kingdom | 280/650 |

*Primary Examiner*—David M. Mitchell
*Attorney, Agent, or Firm*—Arnold, White & Durkee

[57] ABSTRACT

A folding pushchair has a chassis provided on each side with two chassis struts (6, 7) carrying wheels (8). The struts are pivotally connected together, and swing out of a folded position, in which they lie side by side, into a position of use, in which they are secured by means of a fastening device (14). This device has to swing upwards to release the struts but a seat, and hence the weight of a child in the pushchair bears down on the device (14), thereby avoiding accidental folding in use. The folding pushchair is designed so that it can be self supporting in a stable upright position when in its folded condition.

22 Claims, 7 Drawing Sheets

FOLDING PUSHCHAIR

This application is a continuation-in-part application of my prior copending United States patent application Ser. No. 658,665 filed Oct. 9, 1984 now U.S. Pat. No. 4,605,243.

The invention relates to a folding pushchair of the kind comprising a chassis, which is provided on each side with first and second chassis struts carrying wheels at their bottom ends and pivotally connected so that they can swing apart out of a folded position, in which they lie side by side, into a position of use, and are securable in the position of use by means of a fastening device; and, joined to the chassis, a push handle, a back part and a seat part.

The object of the invention is to provide a pushchair of this kind, which can be folded quickly and simply from its position of use but is protected against release of its fastening device as long as a child is in the pushchair.

According to the invention the pushchair is characterised in that the push handle is joined on each side of the pushchair to the first chassis strut by means of a first intermediate link and to the second chassis strut by means of a second intermediate link; in that the fastening device is pivotable upwards, about a bearing on the first chassis strut, out of a fastening position, in which it extends rigidly betwen the first and second chassis struts, into a released position to allow relative movement of the two chassis struts; and in that the seat part is supported on the fastening device in such a manner that it rests on the device when the latter is in its fastening position.

The connection of the push handle to the chassis struts can facilitate and accelerate not only the folding of the chassis but also the movement of the push handle relative to the chassis. The bearing on the fastening device of the seat part ensures that a child sitting in the pushchair will not be endangered by the rapid folding movements of the various parts of the pushchair; as, in the position of use of the pushchair, that is to say with the fastening device in the fastened position, this device is loaded by the weight of a child sitting in the pushchair. The necessary swivelling movement would therefore have to be made against the resulting resistance. Unintentional unlocking is therefore out of the question even if the operator is able to apply the necessary force.

The fastening device may comprise, on each side, an arm which, in the fastening position, extends from the bearing on the first chassis strut to a point of action on the second chassis strut. This construction of the fastening device can be manufactured economically. When not loaded by the weight of a child, the arms can, in a simple manner, make the swivelling movement necessary for release from the fastened position. In addition, they offer good support for a seat surface.

The arms at the sides of the fastening device may be joined together to form a frame by means of crossbars. The frame of the fastening device may then serve as support for a seat board connected to it. This is beneficial, both with regard to the static properties of the fastening device and with regard to possibilities for the support of the seat surface and consequently of the child being carried.

Preferably, the back part is joined to the push handle. This facilitates folding and increases the action of loading by the weight of the child in respect of safety.

A pedal may be provided on the fastening device for the operation thereof, resulting in a simple operating facility for unlocking the fastening device. The simple operating means is made possible only by the safety achieved as described above; there being no danger that confusion of functions will bring about the folding movement as long as a child is still sitting in the pushchair.

One preferred construction is characterised in that an arm of the fastening device is of one-piece rigid construction and has a latching means at its end remote from the bearing on the first chassis strut; and in that the arm is connectable by latching to the second chassis strut in the fastening position. Such rigid arms are components which can be produced economically. Their latching means can, in a simple manner, be so constructed that they move upwards during the swivelling movement. A seat board or other seat surface is moved over its entire length during the swivelling movement. An accidental swivelling movement while the child is still sitting in the pushchair requires, because of the long swivelling arm, a torque which prevents the release of the latching means or signals the danger to the operator.

An advantageous form of construction of the latching means involves a nose on the end of the arm, and a pin over which the nose is engagable is provided on the second chassis strut.

Additional protection against release of the latching means, particularly with the simple rigid construction, is achieved if a spring for holding the latching means in its engaged position is disposed between the arm and the first chassis strut.

Another construction is characterised in that an arm of the fastening device consists of two lever arms each of which is pivoted to a respective one of the first and second chassis struts and which are connected together by an articulation providing a centre of pressure. In this case also the weight of a child still sitting in the pushchair ensures that the pushchair cannot be unintentionally folded up. The two lever arms in their dead centre position, which they assume in the fastened position, act on the chassis and the seat surface in the same way as a rigid arm. A spring is not necessary because there is no latching means to disengage. The movement of the articulation from the dead centre position must be made by a swivelling movement of a lever arm in the upward direction by means of an operating device, that is to say against the weight of a child, if one is in the pushchair. When there is no weight on the seat surface, the latter is also lifted in the region of the articulation. In the folded position the two lever arms lie approximately parallel to one another, in accordance with their articulation on the two chassis struts.

The dead centre position can be achieved in a constructionally simple manner if one of the lever arms has an extension projecting beyond the articulation connecting it to the other lever arm, and that this extension has a stop adapted to bear laterally against the other lever arm. The movement in the downward direction is reliably limited, while the movement in the upward direction, when there is no weight on the seat surface, is not hindered.

In accordance with a further aspect of this invention, there is provided a folding pushchair comprising: a chassis having first and second chassis struts on each side of the pushchair, the chassis struts having wheels at their bottom ends, and the chassis struts being positionable in a folded position in which the first and second chassis struts on each side of the pushchair are side by side, and in a use position in which the first and second chassis struts on each side are spaced apart; a push handle having a bottom end, the push handle being joined to the first chassis strut on each side of the pushchair by means of a first intermediate link, and being joined to the second chassis strut on each side of the pushchair by means of a second intermediate link, each of the first and second intermediate links being pivotally connected to the struts and to the push handle; the connection between the push handle and the chassis struts being such that in the folded position of the pushchair, the bottom end of the push handle is aligned with the wheels of one of the chassis struts on each side of the pushchair for the folded pushchair to be supportable in an upright position on the bottom end of the push handle and the aligned wheels.

The bottom end of the push handle is preferably aligned with the wheels of the first chassis struts which comprise the rear wheels of the pushchair, in the folded position of the pushchair.

In this aspect of the invention the first and second chassis struts on each side of the pushchair are preferably pivotally connected to each other at a connection point, and the distance between the connection point and the wheel of each first chassis strut is greater than the distance between the connection point and the wheel of each second chassis strut so that, in the folded condition of the pushchair, the wheels of the first chassis struts extend beyond the wheels of the second chassis struts.

Further in this aspect of the invention, each first intermediate link is preferably pivotally connected to the push handle at a distance spaced from the bottom end of the push handle, and the distance between the pivot point at which each first intermediate link is connected to each first chassis strut and the lowermost point of each wheel connected to each first chassis strut, is generally equal to the length of each first intermediate link plus the distance between the pivot point at which the first intermediate link is connected to the push handle and the bottom end of the push handle.

Thus, in use, the bottom end of the push handle will be at the same horizontal level as the lowermost point of the wheels of the first chassis strusts at the rear of the pushchair when the pushchair is in its folded position and is standing upright on the bottom end of the push handle and on the lowermost point of such wheels in a stable self supporting position.

The push handle, the first chassis struts, and the second chassis struts are preferably generally parallel in the folded position of the pushchair.

The pivot point at which the first intermediate link is connected to the push handle is preferably closer to the bottom end of the push handle than the pivot point at which the second intermediate link is connected to the push handle.

The folding pushchair includes a safety yoke, the safety yoke being pivotally connected to the push handle, and being pivotally connected to the connection points at which the first and second chassis struts on each side are pivotally connected to each other.

The length of the safety yoke and its connection points preferably are such that the safety yoke will generally be parallel to the push handle and to the chassis struts in the folded position of the pushchair.

The length of the safety connection yoke, its connection points, and the effective lengths of the first and second intermediate links are preferably such that the pivot points at which the push handle is connected to the first intermediate links will move along an annular path during movement of the pushchair between its folded and its use positions.

The invention further extends to a folding pushchair comprising: a chassis which is provided on each side with first and second chassis struts carrying wheels at their bottom ends and pivotally connected so that they can swing apart out of a folded position in which they lie side by side, into a position of use, and are securable in the position of use by means of a fastening device; and, joined to the chassis, a push handle, a back part and a seat part; the push handle being joined on each side of the pushchair to the first chassis strut by means of a first intermediate link and to the second chassis strut by means of a second intermediate link; the pivot point at which the second intermediate link is joined to the push handle lying a distance above the pivot point at which the first intermediate links is joined to the push handle; the fastening device being pivotable upwards, about a bearing on the first chassis strut, out of a fastening position in which the fastening device extends rigidly between the first and second chassis struts; and the seat part being supported on the fastening device in such a manner that it rests on the device when the latter is in its fastening position, wherein in the folded position the pushchair can be stood up in an upright position, thereby only resting upon the lowermost end portion of the push handle and the respective wheels coupled to the first chassis strut.

In a preferred aspect of this invention the first chassis struts are arranged in the proximity of the push handle, the distance between the wheel axis and the pivotal connection point on the first chassis struts is longer than in the second chassis struts, and the length of the first intermediate link plus the length of the push handle between the pivot point at which it is connected to the first intermediate link and its lower end portion is generally equal to the distance between the pivotal point at which the first intermediate link is connected to the first chassis strut and the lowermost point of the wheel coupled to said strut on each side of the pushchair Examples of pushchairs according to the invention will now be described with the aid of the accompanying drawings, in which:

Figure 1:
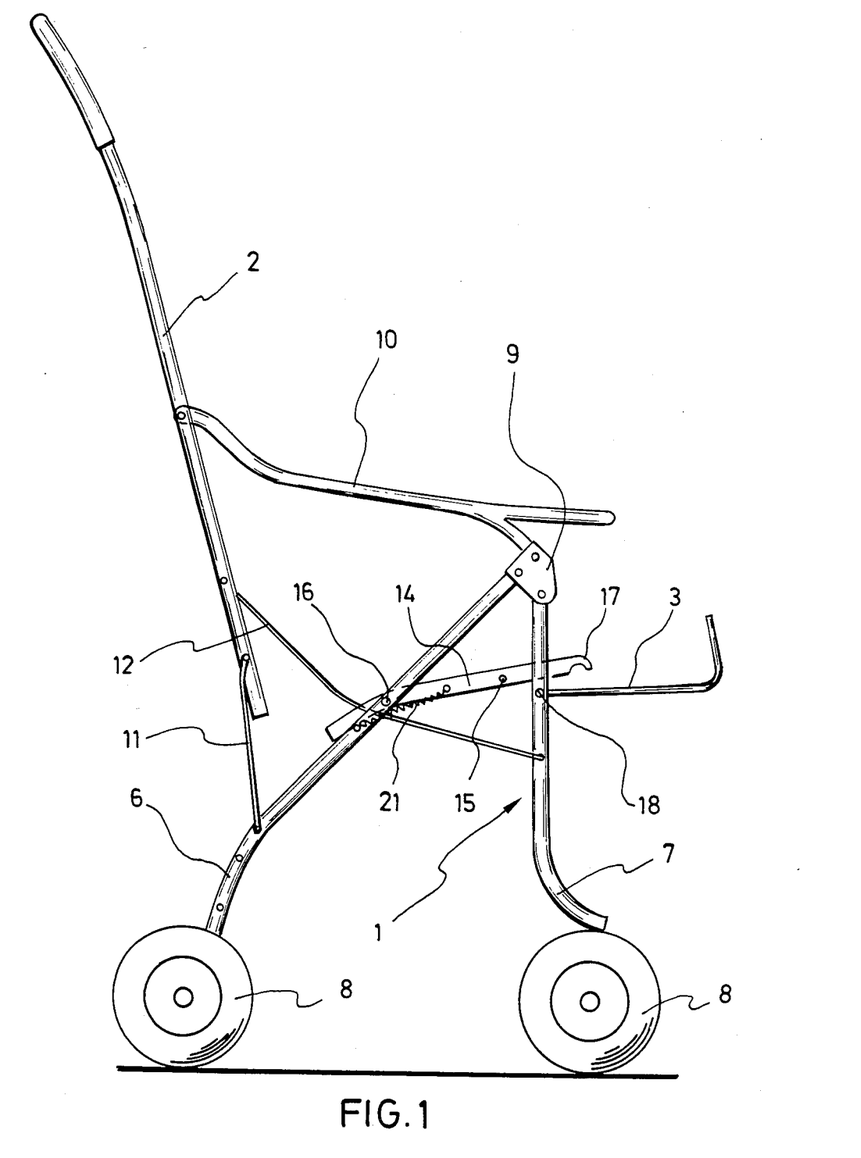
FIG. 1 is a diagrammatical side view of a frame for a pushchair in an intermediate position during folding.
Figure 3:
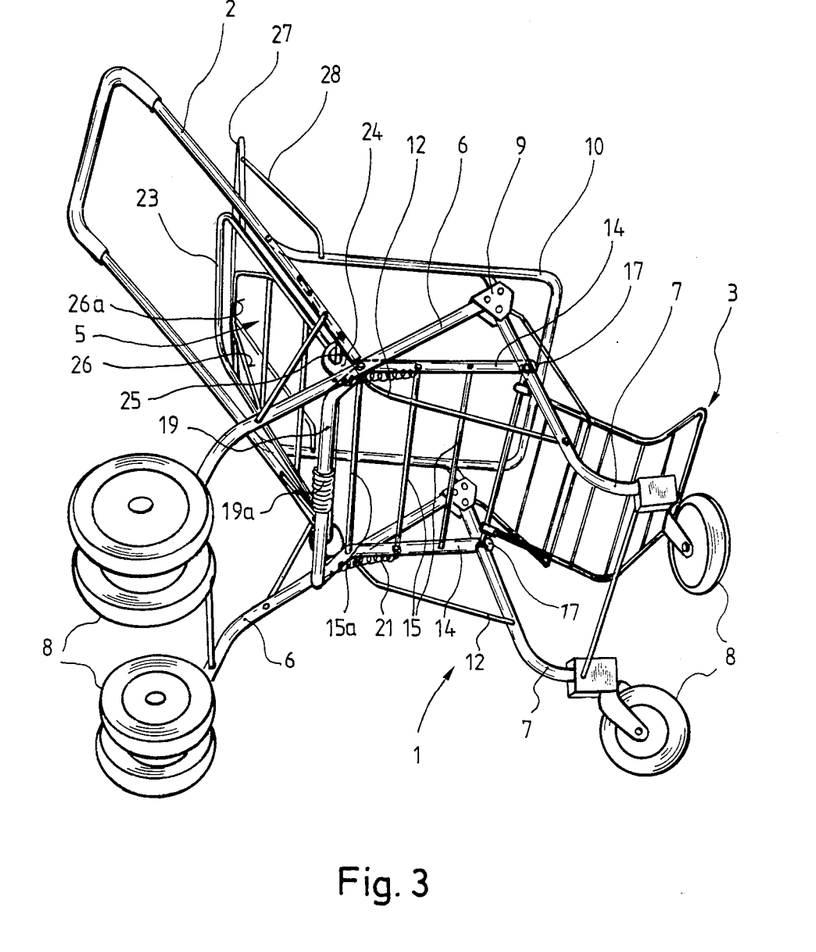
FIG. 3 is a view in perspective of the frame shown in FIGS. 1 and 2, in the position of use.
Figure 4:
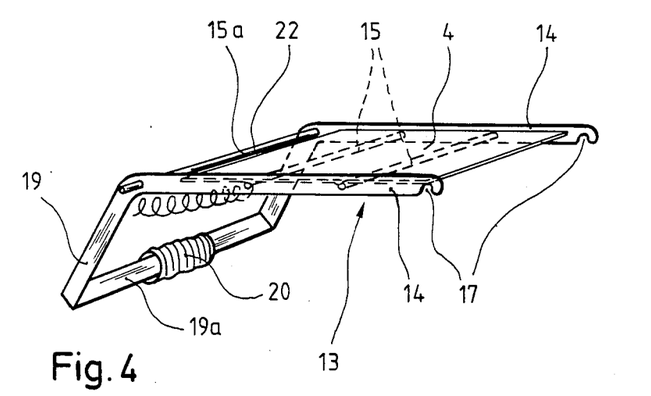
FIG. 4 shows a detail on a larger scale.

The pushchair shown in FIG. 1 comprises a chassis 1, a push handle 2, a foot part 3, and a seat part 4, which is merely indicated in FIG. 4 in the form of a board. A back part 5 of the pushchair can be seen in FIG. 3. All parts of the pushchair which are made of textile material, such as seat coverings, seat side walls and a hood, are omitted from the drawings for the sake of clarity.

The chassis 1 consists essentially of two chassis struts 6 and 7 on each side. At the end of each chassis strut a wheel 8 is mounted. Double wheel sets may also be provided. The other ends of the chassis struts 6 and 7 are in each case articulated side by side on a connecting plate 9, so that they are pivotable relative to each other. They are pivotable in the same plane, so that in a folded position (not shown) of the pushchair they lie with their mutually facing sides directly against one another. On the connecting plate 9 is additionally supported a safety yoke 10, which in plan view is substantially U-shaped and the free ends of which are articulated on the push handle 2 (see FIG. 3, in which, for the sake of clarity, parts of the chassis struts 6 and 7, the connecting plate 9 and parts of the safety yoke 10 have been omitted on the side of the pushchair which lies at the rear from the viewer's viewpoint).

Figure 2:
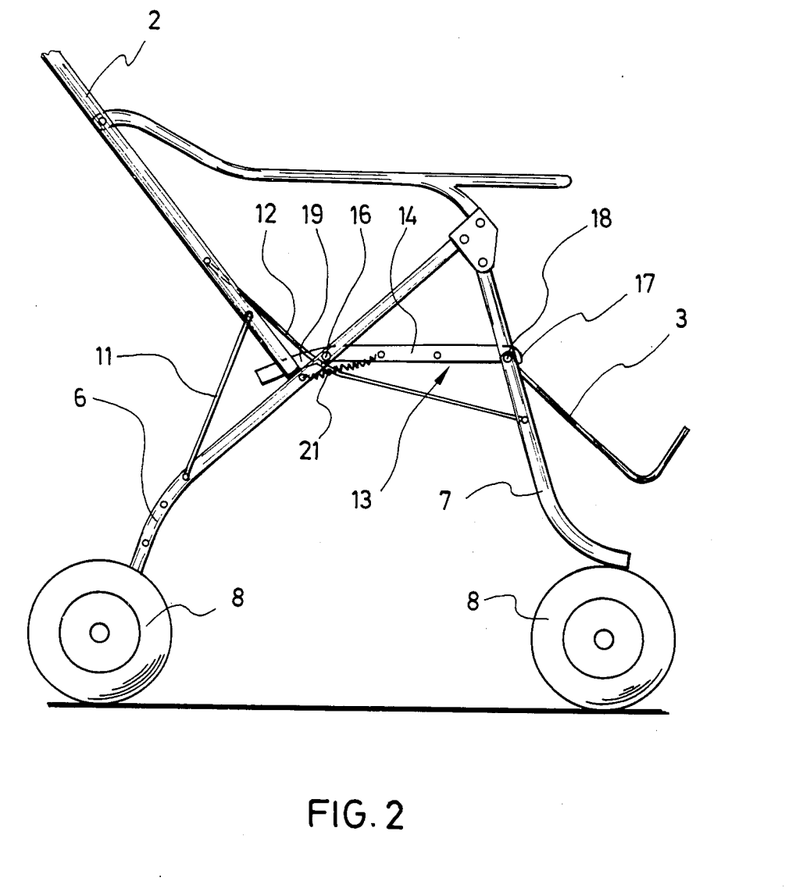
FIG. 2 shows the same frame as FIG. 1 but in the position of use of the pushchair.

The push handle 2 is movably joined by a first intermediate link 11 to the part of the chassis strut 6 which lies near the wheel, and by a second intermediate link 12 to the second chassis strut 7. The latter is the chassis strut situated at the front in the direction of travel. The second intermediate link 12 acts on the push handle 2 above the first intermediate link 11. FIG. 2 shows the position of use of the pushchair. In this position the intermediate links 11 and 12 hold the push handle 2 in such a manner that it is supported by its free bottom end on the chassis strut 6. The point of support has for the sake of clarity been shifted somewhat downwards in the accompanying diagrammatical illustrations. It is expediently situated approximately at seat height, so that the textile coverings of the seat and of the back region, integrated into the push handle (FIG. 3), adjoin one another.

Figure 6:
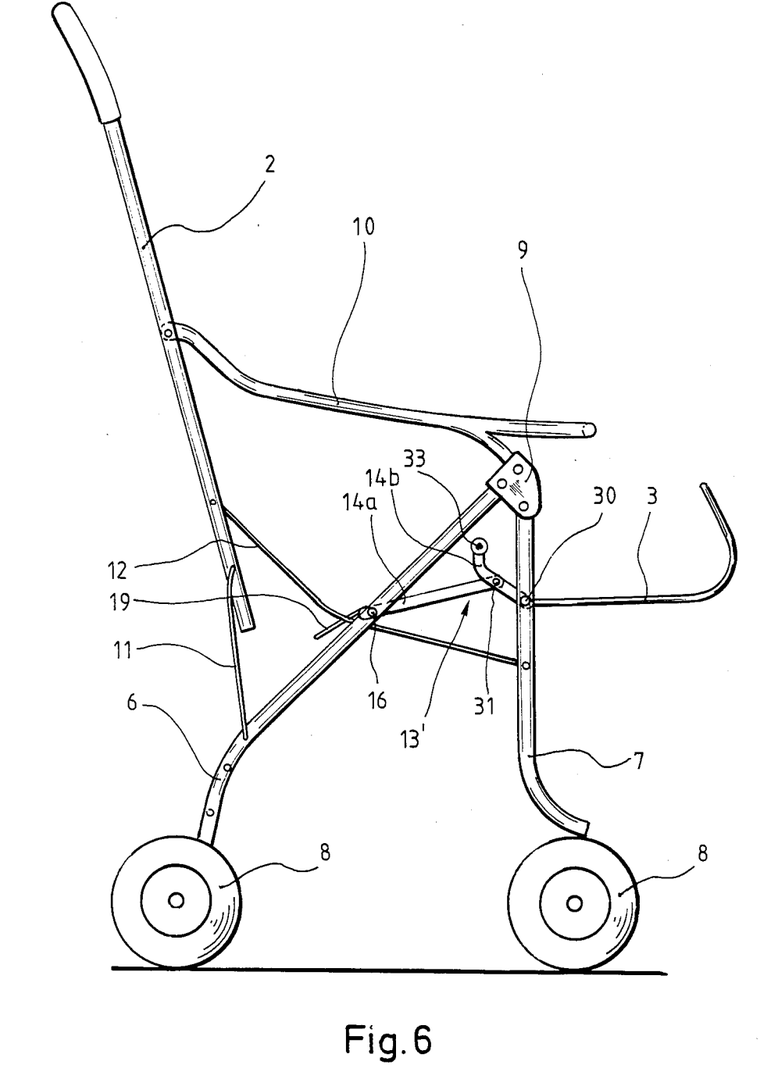
FIG. 6 shows the second pushchair in a position corresponding to FIG. 1.

A fastening device 13 fastens the chassis struts 6 and 7 in their open angular position relative to one another when the pushchair is in the position of use shown in FIG. 2. The fastening device 13 is shown on a larger scale in FIG. 4. On both sides it has a rigid arm 14. The two arms 14 are joined by crossbars 15 to form a frame. At one end of the arms 14 the ends of a crossbar 15a project beyond the frame on both sides. It thus engages in a pivot bearing 16 on the first chassis strut 6. At the end remote from the bearing, each arm 14 has a nose 17 which is open at the bottom and which forms the latching means for the fastened position of the fastening device. In this position (FIG. 2) it engages over a pin 18. In FIG. 4 the arms 14 are extended beyond the crossbar 15a to form a U-shaped yoke 19 integral with it, the cross web 19a of which forms a pedal for operating the fastening device. It is provided with a pedal covering 20. In FIGS. 1, 2 and 6 the fact that, as already mentioned, the push handle 2 is set back relative to the chassis strut 6 has the effect that it cannot be seen that the pedal 19a can be reached with the foot from the rear of the pushchair. In FIG. 3, however, the positions of the push handle 2 and of the pedal 19a can be seen correctly.

In its position of use shown in FIG. 2 the fastening device 13 engages by its nose 17 over the pin 18. A tension spring 21, which is fastened at one end to the arm 14 and at the other end to the chassis strut 6, urges the nose 17 into this latching position. The seat 4, indicated in FIG. 4, is fastened by means of mountings 22 on the crossbar 15a and is supported on the arm 14 and the other crossbars 15. It transmits to the arms 14 the weight of a child sitting in the pushchair. For the purpose of folding the pushchair, the operator presses down the pedal 19a with the foot. The arms 14 are thus swivelled upwards and the nose 17 is disengaged. The seat surface 4 participates in the upward swivelling movement. With the simultaneous forward movement of the push handle 2, the chassis struts 6 and 7 swivel towards one another until they reach their final position, one against the other. An intermediate stage in this movement, directly after the unlocking, is shown in FIG. 1. The nose 17 has already lifted off the pin 18, and the angle between the chassis struts has already been somewhat reduced. The push handle 2 is situated with its bottom end already some distance from the strut 6 and can be swivelled further forwards. The tension spring 21 has no further effect.

If the pedal 19a is operated while the seat surface is still carrying a weight, particularly the weight of a child, the weight counteracts the swivelling movement of the arm 14. The operator is thereby prevented from continuing the swivelling movement by force, or at least is warned against doing so.

In addition to the details of the pushchair which have already been described in connection with FIGS. 1 to 4, FIG. 3 also shows the construction of the back part 5. It is not joined to the seat part, so that its position does not hinder the cooperation of the seat part and the fastening device. The seat part 5 comprises a U-shaped back bow 23, which is mounted on the push handle 2 in the region of the free ends of the latter. The mounting is effected by means of a toothed segment 24, which is here indicated on one side only end and in which the back yoke can be fastened and locked in various positions by means of a crossbar 25. The position assumed is maintained by means of springs, which are not shown here. For unlocking purposes the crossbar 25 is joined to a likewise U-shaped pull means 26, the upper yoke 26a of which can be gripped together with the U-web of the back yoke 23. If, when so gripped, the pull means is pulled upwards to the U-web of the back yoke 23, the latter is unlocked in the region of the toothed segment 24 and can be swivelled to another position.

In FIG. 3 it is also indicated how an end wall yoke 27 adjoining the cross web of the back yoke 23 can be swivelled forwards at an angle to the yoke 23. This position of the end wall yoke is in itself assumed when the back yoke 23 is swivelled into a lying position of the pushchair, that is to say to form an extension of the seat surface, and with the aid of the end wall yoke 27 and the (indicated) textile side parts 28 a closed trough-like head part can be formed in the pushchair.

Figure 5:
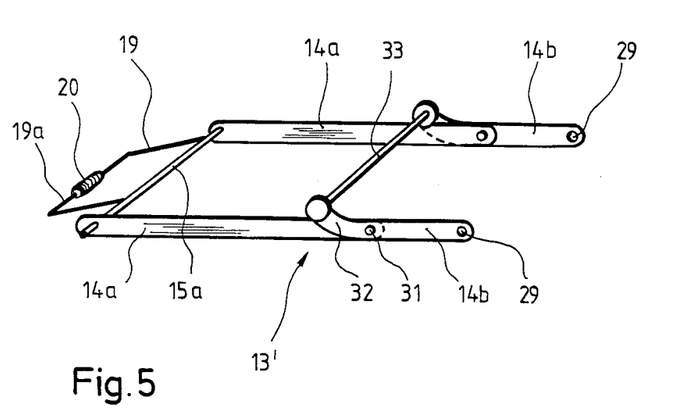
FIG. 5 a detail of a second example on a larger scale.

A construction of pushchair which differs from that described above, in respect of the construction of its fastening device 13', is shown in FIGS. 5 and 6. In these Figures identical components are given the same reference numerals, while corresponding parts are given the same reference numerals with the addition of a dash. The fastening device 13' has on each side, instead of a rigid arm, two lever arms 14a and 14b articulated to one another. The arms 14a are mounted by means of a crossbar 15a, which connects them together, on the swivel bearing 16 of the chassis struts 6, as in the example shown in FIGS. 1 to 4. The lever arms 14b are mounted for swivelling by means of bearing bores 29 on articulation points 30 of the chassis struts 7. The articulation 31 between the arms 14a and 14b connects the free end of the arm 14a to a region of the arm 14b remote from both ends. The arms 14b are in each case situated outside the arms 14a. The extension 32 of the arm 14b freely projecting beyond the articulation 31 follows a curved path. A cross strut 33 connects the ends of the extensions 32 of the arms on the two sides.

FIGS. 5 shows the fastening device 13' in its dead centre position, which corresponds to the fastening position: the arms 14b assuming in relation to the arms 14a a position in which the cross strut 33 rests from above on the arms 14a. A relative movement between the arms 14a and 14b is therefore possible only in the form of a downward movement of the arms 14a in the region of the crossbar 15a, that is to say by means of the pedal 19a, or in the form of a downward movement of the arms 14b in the region of their bearing bores 29, whereby the cross strut 33 is moved upwards. This movement is the unlocking movement, the initial stage of which is shown in FIG. 6. It can be made through the operation of the pedal 19a without noteworthy resistance only when the seat board 4, which is to be imagined to be above the crossbar 15a and the cross strut 33, is not under load, that is to say when there is no child sitting in the pushchair. The loading of the seat surface 4 forces the cross strut 33 downwards and thus forces the fastening device 13' into the dead centre position described. Additional securing by means of a spring is therefore unnecessary.

Figure 7:
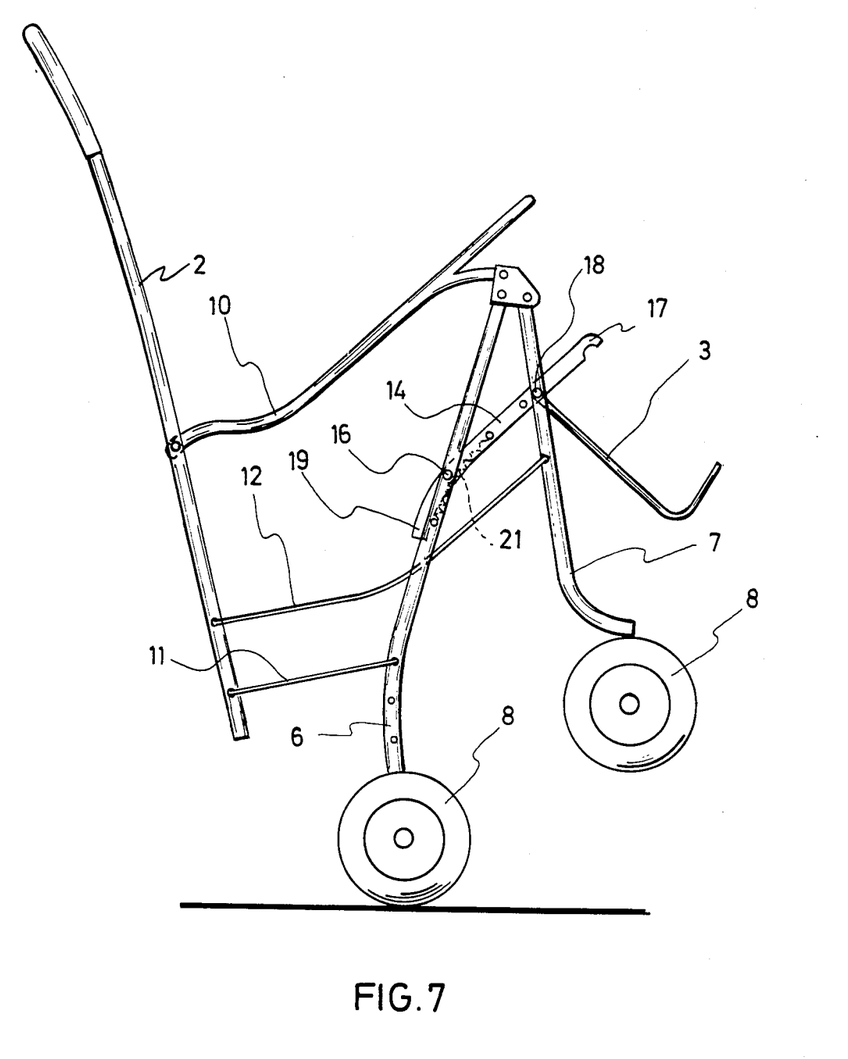
FIG. 7 shows the frame for a pushchair as depicted in FIGS. 1 or 2 but in a further intermediate position during folding of the pushchair, said position coming closer to a folded position of the pushchair.
Figure 8:
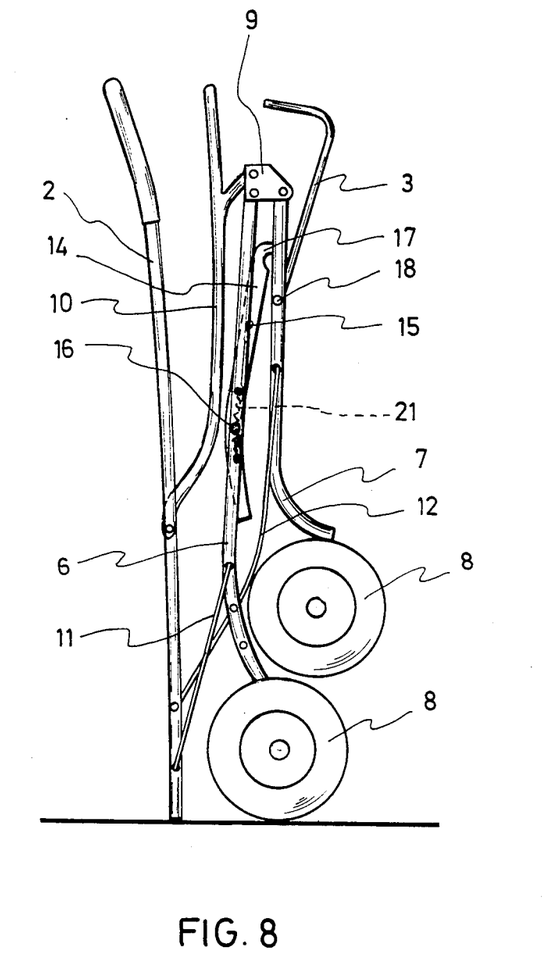
FIG. 8 shows the frame for a pushchair as depicted in FIGS. 1, 3 and 7 in the folded position.

With particular reference to FIGS. 7 and 8 of the drawings, FIG. 7 shows an intermediate state of the frame for the inventiive pushchair, in which the frame is in a more collapsed position with respect to the position shown in FIG. 1. The length of the first and second intermediate links 11, 12 as well as the length of the safety yoke 10 are selected to enable the pivot point of the push handle, at which it is pivotably connected to the first intermediate llink, to travel along an annular path during collapse of the pushchair frame. This leads to the result that the push handle 2 and the first chassis strut 6 approach the state during folding of the pushchair frame, in which they are, in general, in parallel. In the folded position of the pushchair frame, which can be seen in FIG. 8, the push handle 2 and the first chassis strut 6 are in a position in which they lie side by side, and are in general in parallel. The distance between the wheel axis and the pivotal connection point of the first chassis strut 6 has been selected so that it is longer than the distance between the wheel axis and said pivotal connection point 9 of the second chassis strut. In the folded position shown in FIG. 8, in which the first and second chassis struts 6, 7 are also arranged side by side, the wheels coupled to the first chassis struts are in a lower position than the respective wheels coupled to the second chassis struts. Therefore, when said chassis struts 6, 7 as well as the push handle 2 are arranged vertically in the folded position of the pushchair frame, said frame can be supported so that it rests only upon the rear wheels coupled to the first chassis struts 6, and not upon the front wheels coupled to the second chassis struts 7.

The length of the first intermediate link 11 plus the length of the push handle 2 between the pivot point at which it is connected to the first intermediate link 11 and its lower or bottom end portion is, in general, equal to the distance between the pivot point at which the first intermediate link 11 is connected to the first chassis strut 6 and the lowermost point of the wheel 8 coupled to said strut 6 when the first chassis strut is in an upright position. This leads to the result that in the folded position of the pushchair frame, it can be stood up in an upright position, in which it rests only upon the lowermost portions of the respective wheels 8 coupled to the first chassis struts 6 and upon the lowermost end portions of the push handle 2. The lowermost end portion of the push handle 2 is preferably provided with bumper means arranged, for example, within the interior of the lowermost end portions of the push handle 2.

In the folded down position shown in FIG. 8, it is possible to put the pushchair down in a safe manner where it will stand upright in a self-supporting condition. The pushchair or stroller will thus be positioned in a convenient form where it will not readily fall over or roll away. In this folded position the pushchair is compact, is stable, and has the handle portion of the push handle presented in a convenient position for handling the pushchair, whether the folded pushchair is to be lifted, or displaced along the rear wheels 8, or merely held after folding or prior to and during unfolding.

The invention is not restricted to the illustrated examples. An essential consideration is the simple folding and the fastening device which prevents unintentional folding of the pushchair while a child is sitting in it. Variable arrangements include the cross connections between the arms of the fastening device, the shape, size and design of a foot pedal, the construction of the safety yoke and its connection to the various components, and also the construction of individual articulations.

What is claimed is:
1. A folding pushchair comprising:
a chassis having first and second chassis struts on each side of the pushchair, the chassis struts on each side being pivotally connected to each other at a fixed connection point on each chassis strut, the chassis struts having wheels at their bottom ends, and the chassis struts being positionable in a folded position in which the first and second chassis struts on each side of the pushchair are side by side, and in a use position in which the first and second chassis struts on each side are spaced apart;
a push handle having a bottom end, the push handle being joined to the first chassis strut on each side of the pushchair by means of a first intermediate link, and being joined to the second chassis strut on each side of the pushchair by means of a second intermediate link, each of the first and second intermediate links being pivotally connected to the struts and to the push handle at different pivot points, the pivot point at which the first intermediate link is connected to the push handle being closer to the bottom end of the push handle than the pivot point at which the second intermediate link is connected to the push handle, the pivot point at which the second intermediate link is connected to the second chassis strut being located at an intermediate position between the top and bottom ends of the second chassis strut on each side of the pushchair, and the distance between the pivot point at which each first intermediate link is connected to each first chassis strut and the lowermost point of each wheel connected to each first chassis strut, generally being equal to the length of each first intermediate link plus the distance between the pivot point at which the first intermediate link is connected to the push handle and the bottom end of the push handle, so that in the folded position of the pushchair, the bottom end of the push handle is aligned with the wheels of the first chassis struts for the folded pushchair to be supportable in an upright position on the bottom end of the push handle and the aligned wheels.

2. A folding pushchair according to claim 1, in which the bottom end of the push handle is aligned with the wheels of the first chassis struts which comprise the rear wheels of the pushchair, in the folded position of the pushchair.

3. A folding pushchair according to claim 2, in which the distance between the connection point on the first chassis strut at which the first and second chassis struts on each side of the pushchair are pivotally connected to each other and the wheel of each first chassis strut is greater than the distance between the connection point on the second chassis strut and the wheel of each second chassis strut so that, in the folded condition of the pushchair, the wheels of the first chassis struts extend beyond the wheels of the second chassis struts.

4. A folding pushchair according to claim 2, in which the bottom end of the push handle is at the same horizontal level as the lowermost point of the wheels of the first chassis struts at the rear of the pushchair when the pushchair is in its folded position and is standing upright on the bottom end of the push handle and on the lowermost point of such wheels in a stable self supporting position.

5. A folding pushchair according to claim 4, in which the push handle, the first chassis struts, and the second chassis struts are generally parallel in the folded position of the pushchair.

6. A folding pushchair according to claim 3, which includes a safety yoke, the safety yoke being pivotally connected to the push handle, and being pivotally connected to the first and second chassis struts proximate the connection points at which the first and second chassis struts on each side are pivotally connected to each other.

7. A folding pushchair according to claim 6, in which the length of the safety yoke and its connection points are such that the safety yoke will generally be parallel to the push handle and to the chassis struts in the folded position of the pushchair.

8. A folding pushchair according to claim 6, in which the length of the safety yoke, its connection points, and the effective lengths of the first and second intermediate links are such that the pivot points at which the push handle is connected to the first intermediate links will move along an annular path during movement of the pushchair between its folded and its use positions.

9. A folding pushchair according to claim 1, including a fastening device for fastening the chassis struts in their use position.

10. A folding pushchair according to claim 9, in which the fastening device comprises an arm on each side which extends from a bearing on the first chassis strut to a point of action on the second chassis strut in the fastening position.

11. A folding pushchair according to claim 10, in which the arms are joined together by means of crossbars, and in which the arms have latching means at their ends remote from the bearing for latching to the second chassis struts at the point of action in the fastening position.

12. A folding pushchair according to claim 10, in which each arm of the fastening device comprises two lever arms each of which is pivotally connected to the respective one of the first and second chassis struts at the bearing and point of action respectively, and in which the two lever arms of each arm are connected together by an articulation providing a centre of pressure.

13. A folding pushchair according to claim 12, in which at least one of the lever arms has an extension projecting beyond the articulation connecting it to the other lever arm, and in which this extension has a stop adapted to bear laterally against the other lever arm.

14. A folding pushchair according to claim 13, in which one of each of the pairs of lever arms has an extension and in which the extensions are joined by a cross strut forming the stop.

15. A folding pushchair according to claim 14, in which a seat board is fastened on one pair of lever arms and is supported on the fastening device.

16. A folding pushchair according to claim 1, in which the chassis struts on each side of the pushchair are pivotally connected to each other at a fixed connection point on each chassis strut proximate their top ends.

17. A folding pushchair according to claim 16, in which the chassis struts on each side of the pushchair are pivotally connected to each other by being pivotally mounted on a connecting plate.

18. A folding pushchair comprising: a chassis which is provided on each side with first and second chassis struts carrying wheels at their bottom ends and pivotally connected to each other at a connection point on each chassis strut so that they can swing apart out of a folded position in which they lie side by side, into a position of use, and are securable in the position of use by means of a fastening device; and, joined to the chassis, a push handle, a back part and a seat part; the push handle being joined on each side of the pushchair to the first chassis strut by means of a first intermediate link and to the second chassis strut by means of a second intermediate link; the pivot point at which the second intermediate link is joined to the push handle lying a distance above the pivot point at which the first intermediate link is joined to the push handle; the fastening device being pivotable upwards, about a bearing on the first chassis strut, out of a fastening position in which the fastening device extends rigidly between the first and second chassis struts; and the seat part being supported on the fastening device in such a manner that it rests on the device when the latter is in its fastening position, wherein the length of the first intermediate link plus the length of the push handle between the pivot point at which it is connected to the first intermediate link and its lower end portion is generally equal to the distance between the pivotal point at which the first intermediate link is connected to the first chassis strut and the lowermost point of the wheel coupled to said strut on each side of the pushchair, so that in the folded position the pushchair can be stood up in an upright position, thereby only resting upon the lowermost end portion of the push handle and the respective wheels coupled to the first chassis strut.

19. A folding pushchair as claimed in claim 18, wherein the first chassis struts are arranged in the proximity of the push handle, and wherein the distance between the wheel axis and the pivotal connection points on the first chassis struts is longer than in the second chassis struts, so that in the folded position of the pushchair, the wheels of the first chassis struts extend beyond the wheels of the second chassis struts.

20. A folding pushchair according to claim 19, wherein the first chassis struts are at the rear of the pushchair, and the second chassis struts are at the front of the pushchair.

21. A folding pushchair according to claim 18, wherein the first and second chassis struts on each side of the pushchair are pivotally connected to each other proximate their top ends at a connection point which is fixed on each chassis strut.

22. A folding pushchair according to claim 21, wherein the first and second chassis struts on each side of the pushchair are pivotally connected to each other by being pivotally mounted on a connecting plate.

* * * * *

UNITED STATES PATENT AND TRADEMARK OFFICE
CERTIFICATE OF CORRECTION

PATENT NO. : 4,770,437

DATED : September 13, 1988

INVENTOR(S) : Dieter Glaser

It is certified that error appears in the above-identified patent and that said Letters Patent is hereby corrected as shown below:

In Column 9, Line 9, delete "35" before "which" and "the"

Signed and Sealed this

Fourth Day of April, 1989

Attest:

DONALD J. QUIGG

Attesting Officer

Commissioner of Patents and Trademarks